United States Patent Office 3,135,725
Patented June 2, 1964

3,135,725
PROCESS OF POLYMERIZING CONJUGATED DI-
OLEFINS WITH A COBALT SALT-HYDROCAR-
BYL ALUMINUM COMPOUND CATALYST
Earl J. Carlson and Samuel E. Horne, Jr., Akron, Ohio,
assignors to Goodrich-Gulf Chemicals, Inc., Pittsburgh,
Pa., a corporation of Delaware
No Drawing. Filed May 31, 1957, Ser. No. 662,561
12 Claims. (Cl. 260—94.3)

The present invention relates generally to the polymerization of diolefinic hydrocarbons and to new and novel catalysts therefor. More particularly, the invention relates to novel heavy metal organometallic catalysts capable of polymerizing polyolefinic hydrocarbons, and especially the butadiene-1,3 hydrocarbons, to form high molecular weight, solid polymers having a structure of a high order of regularity.

In the Belgian Patent Number 533,362 of Karl Ziegler et al., there is disclosed the use of trialkyl aluminum compounds as catalysts in the polymerization of ethylene to form polymers "not substantially above the liquid range." The same Belgian patent discloses the use of nickel or cobalt as "auxiliary catalysts" (in combination with trialkyl aluminums) in a process for the polymerization or "telomerization" of ethylene said to yield "low molecular polymerization products such as butene-1." The above Ziegler et al. application then goes on to describe the contribution of the application; namely, the use of catalysts formed by reacting (1) a trialkyl aluminum with (2) a compound of a group IVB, VB or VIB metal. The latter catalyst is said to polymerize ethylene to form high molecular weight, solid polyethylenes.

Likewise, in another Belgian Patent Number 534,792 of Karl Ziegler et al., the preparation of catalysts (for the polymerization of ethylene) by the reaction of (1) a compound of a group VIII metal with (2) a dialkyl or diaryl monohalide-type compound. Such a catalyst is said to be useful for the polymerization of ethylene.

In the copending application of Carlin F. Gibbs et al., Serial No. 503,027, filed April 21, 1955, there are disclosed a number of different types of "stereospecific" catalysts capable of converting monomeric diene hydrocarbons to solid high molecular weight polymers having an essentially all-1,4 structure i.e. in which the diene units are united in a head-to-tail fashion designated herein "1,4." Among the latter catalysts are those prepared from the reaction of (1) a compound of a metal of the 4th to 10th positions of the long, horizontal periods of the chart of the elements as drawn by H. G. Deming (shown in the 23rd edition of Handbook of Chemistry and Physics, pages 342 and 343, published 1951 by Chemical Rubber Publishing Co., Cleveland, Ohio) and (2) an organometallic compound. The latter Gibbs et al. application is generic to the employment of such catalysts in the polymerization of dienes. The present application, specific to cobalt-containing catalysts, is a continuation-in-part of the above-mentioned Gibbs et al. application.

In accordance with the present invention it has been found that superior stereospecific catalysts for the polymerization of conjugated diene hydrocarbons can be produced by a method comprising the steps of (1) thoroughly dehydrating a cobalt compound, particularly while protecting the latter with an inert solvent or diluent, and (2) combining, with the dehydrated product of the preceding step, an organometallic compound capable of reducing, reacting with, complexing with, or solvating the dehydrated cobalt compound (the organometallic compound having in its structure at least one organic group, per molecule, bound to a metal atom through a carbon atom). Also in accordance with the present invention, where the catalyst is prepared in the presence of an aromatic hydrocarbon solvent or diluent at least a portion of the cobalt passes into solution forming clear, active catalysts (filtered, if necessary, to remove residual solids) which are most novel in that they appear to be the first completely soluble catalysts to be known as having directive or stereospecific influence over the polymerization of diene hydrocarbons. With butadiene-1,3 hydrocarbons, these cobalt catalysts, whether soluble or only partially soluble, produce essentially all-1,4 polymers which are solid, rubbery and high in molecular weight. According to this invention, the soluble catalysts can be prepared either by interaction of a properly dehydrated cobalt compound with a vigorously-reduced organometallic compound in the presence of the aromatic hydrocarbon and then separating residual solid matter or by combining the cobalt compound with the aromatic hydrocarbon and a hydride-free $RnAlX_{3-n}$ type compound wherein R is a hydrocarbon radical, n is a number from 1 to 2, and X is a halide atom (chloride, bromide, iodide or fluoride). In some cases where an aluminum compound such as isobutyl aluminum dichloride or diisobutyl aluminum chloride is employed, catalyst formation occurs with little evidence of reaction, the cobalt compound obviously passing into solution or being complexed in some manner.

Also according to this invention, it has been found that the degree of hydration (or really dehydration) and oxygen content of the cobalt compound has a strong influence on the properties and polymerization characteristics of the catalyst. In some cases a cobalt compound containing small amounts of water will not form active catalysts. In most cases quite small variations in water content will also cause variation in the cis-1,4 and trans-1,4 content of the polymers. The cobalt compound should be anhydrous, or at least as dry as is possible to make it. By "anhydrous" is meant freedom from adsorbed, absorbed and chemically-bound water. Hydrated salts as $CoCl_2 \cdot 2H_2O$ or $CoCl_2 \cdot 6H_2O$ will not form active catalysts until the two or six moles of water of crystallization are driven off. Obtaining a truly anhydrous cobalt compound is ordinarily not convenient by techniques that involve handling of anhydrous solids or liquid in vacuum or inert gaseous atmospheres. When the dehydration is carried out in an inert liquid solvent or diluent, preferably a hydrocarbon which can be employed in the polymerization medium, the cobalt compound is much more effectively dried and protected in subsequent handling. Anhydrous, solid cobalt compounds are very easily dried and protected if the solvent or diluent is one which will form an azeotropic boiling mixture distilling at a temperature at which water will be driven off in the distillate. In addition, the azeotropically-distilled solids usually are obtained as very finely-divided dispersions which are very reactive in the catalyst-forming step. Most important, however, is the high degree of reproducibility obtained with the azeotropic dehydration method. High temperature (150 to 400° C.) drying in a high vacuum also produces an anhydrous cobalt compound of great activity if the anhydrous solid is protected at all times by a dry atmosphere. $CoCl_2 \cdot 6H_2O$ can be dehydrated by heating with acetyl chloride or acetic anhydride.

The soluble, cobalt-containing catalysts obtained by the method of this invention have advantages derived from their soluble form and also other advantages derived from the actual chemical and physical nature of the catalysts themselves. For example, the solutions of the rubbery polymers of butadiene or isoprene produced by the soluble catalysts are very nearly transparent. Recovery of a pure polymer from such a product is a simple matter compared to the case where a solid, difficultly-soluble precipitate must be dissolved and extracted from a dissolved or precipitated polymer. The already low cobalt, and other metal, content of such a product is easily reduced to very, very low levels. The soluble form of the catalyst also makes for greater ease in handling and greater precision in measuring catalyst quantity, and gives less trouble than precipitate-containing catalysts (some of which change profoundly with age).

The soluble catalysts have a strong tendency toward the formation of 1,4 diene polymers. With butadiene the strong preference is toward an all cis-1,4 structure. With isoprene the polymer is essentially all cis-1,4. The specificity of these catalysts do not appear to be critically dependent on the molar ratio cobalt:organometallic compound. These soluble catalysts are very active, they induce polymerization with little or no "induction period" and they have very high "efficiency" for polymerizing butadiene (whereas butadiene, sometimes is less responsive than, for example, isoprene to catalysts made from compounds of other heavy metals). The proportion of the soluble catalysts required for good reaction rates is very low. These catalysts also produce diene polymers which are high in molecular weight and low in gel (i.e. highly soluble).

As noted above, the azeotropic distillation step is carried out in the presence of a distillable liquid or vaporizable substance (or vapor) that is capable of forming an azeotropic boiling mixture (hereinafter referred to as an "azeotrope") with water, which mixture boils at a temperature sufficiently high to drive water, and especially water of crystallization, out of the cobalt compound. Anhydrous hydrogen chloride will do this at temperatures up to 400° C. or more. In addition, there are quite a number of hydrocarbons which will form such an azeotrope with water, notably members of the aromatic series such as benzene, tolene, and xylene. The latter are believed to participate to some extent in the formation of the cobalt-containing soluble catalysts. Soluble catalysts ordinarily are not obtained with aliphatic solvents or diluents. Of these, toluene boils at about 111° C. which is barely high enough to remove the water of crystallization from $CoCl_2$ (liberated at about 106° C.). Dehydration with toluene is slow and the degree of dehydration obtained represents the marginal state of hydration at which active catalysts will be obtained. Xylene is particularly preferred because the water-xylene azeotrope boils at about 137 to 138° C., a temperature easily sufficient to rapidly dehydrate the preferred $CoCl_2$ to the characteristic bright blue, anhydrous $CoCl_2$. The cobalt compound, if solid and/or insoluble, need only be crushed to granular or crystal size before drying because the distillation step will further sub-divide the granules to provide a dispersion of finely-divided, readily-reactive anhydrous solid. Liquid cobalt compounds or those which are soluble in the distillation medium offer no problems of sub-division. Agitation is preferably employed to smooth out the distillation step. In many cases, it may be desirable to pre-heat the hydrated cobalt compound at 100 to 150° C. in air or an inert atmosphere to drive off gross amounts of water and thereby reduce the time of distillation and the quantity of hydrocarbon distillate to be handled. Following distillation, the anhydrous cobalt compound ordinarily is not separated from the distillation solvent but the dispersion or solution is stored under an inert atmosphere, as such, until needed.

The next step in the preparation of the catalysts comprises the intermingling of the cobalt compound dispersion with the organometallic catalyst-forming constituent under conditions permitting catalyst formation to take place. Ordinarily, this is carried out in the presence of the small amount of solvent originally present in the cobalt dispersion prepared as described above. More solvent or diluent may be added, if desired. Reaction usually is initiated in from 1 to 2 hours, although longer "aging" times usually are better. The catalyst-forming reaction can be carried out at any temperature below about 200° C. with temperatures below about 100° C. being preferred. Agitation is usually beneficial during the catalyst-forming step. Of course, due to the nature of the catalyst-forming ingredients care must be exercised to exclude the atmosphere during the catalyst-forming reaction. Solvents or diluents present, if any, should also be quite pure and very low in water content.

Where a completely-soluble catalyst is desired, the reaction mixture resulting from the preceding-described step, where an aromatic hydrocarbon is present, need only be filtered and/or diluted with solvent and then filtered to obtain a solution of catalyst. Where the catalyst-forming reaction is carried out in a small amount of hydrocarbon (such as xylene) containing a mixture of $CoCl_2$ and a trialkyl aluminum such as triisobutyl aluminum, the product will be a dark slurry. Filtration or centrifuging of such a mixture leaves a clear, only slightly colored solution in which no Tyndall effect can be observed. Such product is one of the novel, highly-active, stereospecific soluble catalysts of this invention. The solid matter taken out of such a catalyst appears to be catalytically inactive in a stereospecific sense, at least.

The cobalt catalysts of this invention are utilized to polymerize any polyolefinic hydrocarbon and particularly the conjugated diene hydrocarbons. This can be done by bringing the catalyst and monomeric hydrocarbon together under a suitably inert atmosphere, at a temperature from about −30 to about 100° C. or higher, and at low pressures between sub-atmospheric and about 100 atmospheres. This polymerization step is best carried out by diluting the catalyst with a solvent or diluent until a level is reached where a controlled reaction and sufficient fluidity for efficient heat removal can be maintained. Agitation of the mixture is generally desirable. From about 1 to about 20 volumes of solvent can be employed for each volume of monomers, from about 4 to about 15 volumes being preferred. The solvent or diluents useful for this purpose are those which are inert to organometallic compounds. Hydrocarbons are best for this service including the aliphatic, cycloaliphatic and aromatic hydrocarbons. Acetylenic hydrocarbons, however, often have inhibiting effects in the polymerization of dienes and should not be present in the solvent or monomers. Monoolefinic hydrocarbons and/or diene hydrocarbons, however, can be employed as solvents or diluents, or as a portion of the total diluent, in a proper case. Butane, pentane, hexane or heptane among the aliphatics and benzene, toluene or xylene among the aromatics are preferred solvents and diluents both for catalyst preparation and for polymerization.

It is difficult to specify the minimum cobalt content required for catalytic activity, mainly because the amount of soluble cobalt present in any of these catalysts is usually very, very small (insoluble unreacted cobalt compound is without effect). Analysis of the soluble catalysts reveals that there may be as much as 50 to 100 moles of dissolved aluminum for every one mole of dissolved cobalt (in a catalyst formed by reacting 4 moles of $CoCl_2$ with one mole of triisobutyl aluminum). Further, the relative proportions of cobalt compound to organometallic reducing agent utilized in making the catalyst does not appear to have pronounced influence on the stereospecific nature of the catalyst produced. Proportions (based on the monomers) may also vary quite widely, for example, from as little as about 1 millimole (mM.) per liter of solvent to 100 mM./l., these latter amounts being reacted with from about 100 to about 1 mM./l. of the organometallic constituent. A molar ratio (Co/Al) of from about 25:1 to about 1:1, more preferably about 5:1, may be employed to convert butadiene-1,3 to all cis-1,4 polymer. With isoprene, Co/Al ratios of between 15:1 and 1:5 produce all 1,4 polymers greatly predominating (i.e. above about 80%) in cis-1,4 structure.

When 4 moles of anhydrous $CoCl_2$ (dispersed in xylene) are reacted with one mole of triisobutyl aluminum a dark, apparently inactive precipitate is formed. The clear liquid obtained from the latter catalyst is an active catalyst and contains about 2 moles of chlorine for every mole of aluminum. The latter seems to indicate the formation of an $RAlCl_2$ type compound or complex wherein R could be isobutyl, hydrogen, cobalt or other cobalt organometallic combination. A mixture of such compounds or complexes could be formed.

The cobalt compounds useful in the production of catalysts of this invention have the general structure $Co(A)_n$ wherein A is a monovalent anion and $n$ is one of the higher valence states of cobalt (i.e. 2 or 3). Thus, there may be utilized any organic or inorganic acid salt such as any of the halides (chloride, bromide, fluoride, and iodide); the sulfates; the oxyhalides; the hydroxyhalides; the acetylacetonates, the acetates, the oxalates, the tartrates and ammonium/tartaric acid complexes; cobalt perfluoroborate; cobalt stearate; cobalt hexahydrophthalate; cobalt polyacrylate; cobalt sorbate; and others. Much preferred are the anhydrous halides of cobalt (i.e. chloride, bromide, fluoride and iodide), particularly the dichloride.

The organometallic compound utilized in making the catalysts of this invention may be any such compound capable of reducing or otherwise combining with the particular cobalt compound utilized. As used herein, the term "combining" includes any of the complexing type reactions involving coordinate valences as well as those chemical reactions involving primary valence bonds and it also includes those instances where the two ingredients may merely dissolve one in the other. Compounds of the metals of groups I to VIII of the periodic table can be employed, although the compounds of the metals groups I to III are preferred. Hydrocarbon-substituted alkali metal and alkaline earth metal compounds can be employed such as butyl sodium, butyl lithium, di-n-butyl zinc and many others. Particularly preferred, however, are the hydrocarbyl aluminums. The term "hydrocarbyl" is employed herein as a contraction of the words "hydrocarbon radical" indicating the presence in the molecule of one or more of hydrocarbon substituents attached to aluminum through a carbon-aluminum bond. Aluminum compounds of this same general type which may be employed include trialkyl aluminum compounds ranging from trimethyl aluminum to triethyl aluminum, triisobutyl aluminum, trioctyl aluminum, and higher derivatives. There may also be employed $R_nAl(X)_{3-n}$ type compounds wherein R is hydrocarbon, X is a monovalent non-hydrocarbon radical such as halide (chloride, bromide, iodide, and fluoride), the corresponding oxyhalides, alkoxy, aroxy, carboxy and others. The latter type compound includes dialkyl, diaryl, dialkaryl or diaralkyl aluminum compounds such as diethyl aluminum chloride, diisobutyl aluminum chloride, diethyl aluminum bromide, diethyl aluminum fluoride, diisobutyl isobutoxy aluminum, diethyl phenoxy aluminum, diisobutyl aluminum acetylacetonate and others. Also found very effective are the $RAlX_2$ type compounds (wherein R and X are as defined above) such as ethyl aluminum dichloride, isobutyl aluminum dichloride, ethyl aluminum dibromide, and others. Mixtures of one or more of these various aluminum compounds can be utilized.

Most preferred are the trialkyl aluminum and alkyl aluminum halides. The former compounds react with the cobalt compound in a controllable fashion producing catalysts of great activity; the latter combining with cobalt compounds, often without precipitate formation. The dialkyl or monoalkyl aluminum derivatives preferably are free of hydride when it is desired to form a soluble catalyst which does not require filtration.

Following the polymerization period, the reaction mixture is treated with a catalyst-killing substance such as alcohol, oxygen-free water, an amine, a carboxylic acid such as tartaric acid, an aqueous alkali hydroxide, a heavy metal chelating or complexing agent such as tartaric acid, the polyphosphates, ethylene diamine tetracetic acid, and the like. Treatment with aqueous tartaric acid, then with ammonia, forms stable aqueous extracts of cobalt and aluminum. Treatment with many of these substances not only inactivates or kills the catalyst but also solubilizes the catalyst and facilities its extraction. The catalyst-killing step is preferably carried out under an inert atmosphere such as dry nitrogen, dry helium, or hydrocarbon vapors.

Extraction is carried out by washing the polymer or polymer solution one or more times with fresh solvent, alcohol, water, etc. until substantially free of catalyst residues. If, after extraction is complete, the polymer yet remains dissolved in, or associated with, solvent, diluent, etc., the polymer can be precipitated and then freed of excess solvent by filtering, squeezing, drying, etc. Polymers of dienes such as butadiene-1,3, and isoprene are completely soluble in hydrocarbon solvents and, unless gross amounts of a miscible nonsolvent are utilized in the catalyst-killing step, must be precipitated by addition of alcohol, acetone, etc. After separation from solvents, alcohols, etc. the solid polymer is usually stabilized and dried and then milled to form sheets suitable for use in the rubber factory. The product of such a series of treatments usually is very high in molecular weight, it is very pure, and it has excellent physical properties. The essentially all cis-1,4 polymers tend to be softer, more rubbery while those containing appreciable trans-1,4 structure tend to be hard and/or tougher.

The monomers which can be polymerized, according to this invention, with the cobalt catalysts include the conjugated diolefinic hydrocarbons containing at least one $CH_2=C<$group. Thus, there may be utilized butadiene-1,3 (the simplest conjugated olefin); isoprene; piperylene; 2,3-dimethyl-butadiene-1,3; pentadiene-1,3 (4-methyl-butadiene-1,3); 2-methyl-pentadiene-1,3; hexadiene-2,4; 4-methyl-hexadiene-1,3; 2-methyl-hexadiene-2,4; 2,4-dimethyl-pentadiene-1,3; 2-isopropyl-butadiene-1,3; 1,1,3-trimethyl-butadiene-1,3; octadiene-2,4; 2,5,5-trimethyl-hexadiene-1,3; 2-amyl-butadiene-1,3; 1,1-dimethyl-3-tertiary-butyl-butadiene-1,3; 2-neopentyl-butadiene-1,3; myrcene, alloocimene or the like; or it may be a conjugated alicyclic polyolefin hydrocarbon such as cyclopentadiene, cyclohexadiene-1,3, cycloheptadiene-1,3; dimethyl fulvene and the like; or an aryl-substituted diolefin hydrocarbon such as 2-phenyl-butadiene-1,3; 2,3-diphenyl-butadiene-1,3; diphenyl fulvene and the like. Mixtures of any two, three or more of such conjugated polyolefins may be used. There may also be utilized mixtures of one or more of the above, or one or more of the above with one or more monoolefinic compounds capable of interpolymerizing under these conditions. In the latter case, the conjugated diene hydrocarbon usually should predominate (i.e. be present in amount at least 50%) in the monomeric mixture.

The preferred monomers are the butadiene-1,3 hydrocarbons containing not more than 5 carbon atoms, specifically butadiene, isoprene and piperylene. Butadiene-1,3 seems to be especially responsive to the cobalt catalysts of this invention, this monomer being more easily polymerizable to an all cis-1,4 polymer than others of the preferred class and for the latter reason it is the preferred monomer.

The invention will now be described with reference to several specific examples, intended as being illustrative only, describing the preparation of several catalysts and their use in polymerizing butadiene and isoprene.

*Example 1*

In this example, commercial grade butadiene-1,3 which has been flash-distilled prior to use, is employed in a polymerization carried out in dry benzene in the presence of a catalyst prepared by reacting anhydrous $CoCl_2$ with triisobutyl aluminum. The first step in preparing this catalyst is the preparation of a truly anhydrous form of $CoCl_2$. This is accomplished by charging 238 grams of reagent grade $CoCl_2 \cdot 6H_2O$ to an open 2-liter resin kettle.

The kettle and the salt are then put in an air oven for several days at 138° to 165° C. The weight loss in this time is about 110 grams. The kettle is flushed with dry nitrogen gas while it is being removed from the oven. A reflux condenser, a mechanical stirrer, and 1-liter of xylene (flash-distilled and stored over $CaH_2$) are added thereto. All during these manipulations nitrogen flow through the kettle is maintained. The kettle and its contents are heated to reflux while vigorously agitating the slurry. The temperature under reflux reaches a steady state at 137° C. at which point the collection of condensate is then begun, over a period of four hours 200 ml. of xylene being collected in this fashion. Separation of water seems to have been complete in the first hour of distillation. At the end of this treatment the kettle is allowed to cool while continuing vigorous agitation under a continuous flow of nitrogen. The kettle at this point contains a very fine surry of light blue solid adjudged to be anhydrous $CoCl_2$. The lost xylene is then replaced with dry xylene. The finished suspension is found on analysis to contain approximately one mole of anhydrous $CoCl_2$ or about 0.1090 gram of anhydrous $CoCl_2$ per gram of suspension.

The above $CoCl_2$ suspension is combined with triisobutyl aluminum in 1-quart glass beverage bottles, the bottles first having been dried in a high temperature air oven and then allowed to cool while passing in a stream of dry nitrogen. Charging is performed under nitrogen by adding, first, a measured quantity (by weight) of the $CoCl_2$ suspension and then a measured quantity of liquid triisobutyl aluminum added by hypodermic syringe. The bottles are then sealed and put in a 30° C. water and allowed to tumble overnight. The next day the light blue solid of the $CoCl_2$ has completely disappeared and the bottle contains a dark, blackish precipitate. Benzene and 40 grams of flash-distilled commercial butadiene are then added to each bottle (under nitrogen flow) and the bottles resealed under a positive pressure of 15 p.s.i. of dry nitrogen. The bottles are then put back in the 30° C. water bath where they are tumbled for an additional period of 21 hours. At the latter point the bottles are removed from the bath and each is found to contain a very dark, very viscous cement-like solution. The bottles are each treated by addition of a stabilizing amount of an antioxidant ("Age-Rite White"+"VDH") plus sufficient triehyltamine to completely inactivate the catalyst, these substances being injected as a suspension in a benzene/methanol mixture through the sealed caps of the bottle before the contents of the latter are exposed to the air. Then the bottles are put back into the water bath and agitated for a time to insure dispersion of the antioxidant and interaction of the catalyst-killing triethylamine. The bottles are then opened and the contents emptied into an open beaker containing a 4:1 mixture of benzene:methanol. The resulting mixture is agitated steadily, meanwhile adding pure methanol to the polymer until the polymer precipitates out as a crumb. The benzene-methanol liquor is discarded and the solid crumbs extracted at least once with pure methanol. After the last alcohol extraction the crumbs are wash-milled to form sheets which are dried in a vacuum drier. The data on these experiments are as follows:

| Material | Samples | | | | | |
|---|---|---|---|---|---|---|
| | A | B | C | D | E | F |
| $CoCl_2$ dispersion (g.) | 33 | 30 | 30 | 34 | 27 | 25 |
| $CoCl_2$ (mM.) | 27.7 | 25.2 | 25.2 | 28.5 | 22.6 | 21.0 |
| Xylene dispersion (ml.) | 34 | 31 | 31 | 35 | 28 | 27 |
| Benzene added (ml.) | 466 | 469 | 469 | 465 | 465 | 473 |
| Triisobutyl aluminum (ml.) | 0.915 | 0.952 | 1.11 | 1.50 | 1.495 | 1.87 |
| Total Solvent (ml.) | 500 | 500 | 500 | 500 | 500 | 500 |
| Co/Al Molar Ratio | 7.55:1 | 6.6:1 | 5.66:1 | 4.72:1 | 3.77:1 | 2.8:1 |
| Conversion, percent [1] | 97.5 | 90 | 92.5 | 95 | 97.5 | 95.5 |

[1] Percent/wt. of monomer converted to dry polymer.

Upon examination with the infrared spectrophotometer in the manner described by Richardson and Sacher, Rubber Chemistry and Technology Vol. XXVII, No. 2, pages 348–362, it is found that polybutadienes produced in this fashion possess an infrared spectrum indicative of an essentially all cis-1,4 structure. In this evaluation little or no trace of trans-1,4 or 1,2 structures are found. The spectrophotometer does not appear able to show up a peak in the spectrum if the structural groups are widely distributed over the length of the polymer chain. In other words a sufficient number of the groups must be consecutively connected to show up in the trace. Other comparative tests seem to indicate that uniformly-distributed sterical configurations other than cis-1,4 units do not occur in these polymers to any appreciable extent.

The polymers are also tested by vulcanizing in standard natural rubber tire tread and carcass compounds. The physical strength properties are excellent, somewhat below those of conventional GR–S, but much better than randomly-constituted polybutadienes. Hysteresis values are intermediate between GR–S and Hevea indicating great utility as a heavy tire carcass rubber. Crystallization rate (at 65° C.) and crystalline melting point studies show these all cis-1,4 polybutadienes to be highly crystalline (i.e. at least as crystalline as Hevea rubber). Polybutadienes (all cis-1,4) produced with the above-described type of two-phase cobalt catalyst (solid and liquid) have crystalline melting points which appear to be in the range of −60 to −85° C. Upon X-ray diffraction, the latter polybutadienes show a sharp ring pattern characteristic of a sample containing randomly oriented crystallites.

*Example 2*

In this example, catalysts similar to that of Example 1 are centrifuged to settle out the dark, solid precipitate. This operation and all subsequent steps are carried out under a continuous flow of dry nitrogen. The clear liquid in each tube is then decanted off and the tube refilled with benzene and the tube shaken to redisperse the solid. This operation is twice more repeated. The clear liquid removed from each tube is saved and combined in a quart glass beverage bottle with the standard amount of butadiene as in Example 1. The solid remaining in each tube after the last wash is redispersed in 400 ml. of fresh, dry benzene and combined in a bottle with 32 grams of butadiene. The bottles are then sealed under about 15 p.s.i. dry nitrogen pressure and put into a 30° C. water bath for 16 to 24 hours. Next day only one of the four solid-containing bottles was found to exhibit any signs of viscosity increase. This latter bottle is treated with 10% by volume of methanol to kill the catalyst (if any) and precipitate any polymer present. Only about 3 grams of an amorphous, highly-jelled (up to 65%) polymer is obtained, this polymer having a random structure having a large or perhaps even predominant 1,2 polymer content together with a fair proportion of cis-1,4 and some trans-1,4. The solid is judged to be relatively inactive as a catalyst.

The remaining solid-containing bottles are put into a 50° C. bath and tumbled therein for 3 more days. The bottles are then treated with methanol and very small amounts of amorphous polymer are isolated therefrom. Infrared examination of these samples show their structure to be closely similar to that of the first-described sample with the infrared trace showing in addition an hydroxyl (−OH) peak.

In contrast, the clear liquid removed in the centrifuge wash liquor is extremely active, producing high yields (90–100%) of soft rubbery all cis-1,4 polybutadienes.

*Example 3*

A catalyst is prepared, as in Example 1, from 8 grams of a xylene dispersion of anhydrous $CoCl_2$ (equivalent to 22.1 mM. $CoCl_2$), 2.7 ml. of triisobutyl aluminum (11 mM.) and 160 ml. of dry benzene. This corresponds to a Co/Al molar ratio of 2:1. This mixture is protected at all times by dry nitrogen and is allowed to react at 50° C. for a total of 16 hours. The bottle is then allowed to stand until the black solid has settled out. At this time about ⅓ of the clear (no Tyndall effect) liquid is withdrawn, mixed in another bottle with 20 grams of a purified isoprene (the latter containing less than about 0.1 mol percent of total inhibitors) and the new bottle tumbled in a 50° C. water bath for 3 to 4 days. At the end of this time the contents of the bottle are clear, have a slightly yellowish color, and are very viscous. About 10% methanol is then injected and the bottle agitated until dispersion of the methanol is complete. The bottle is then opened to the air and its contents treated with sufficient additional methanol to precipitate the solid polymer which is then washed only once with fresh methanol and dried. The yield of polymer is 100%, the polymer being a rubbery, all 1,4 polyisoprene having more than 85% of its structure as cis-1,4 units (remainder largely trans-1,4). The polymer contains only 9% gel and only 0.08% ash. The soluble cobalt catalyst seems to have been very effective in polymerizing isoprene, and, moreover, to have been quite easy to wash out of the product.

*Example 4*

In this example, a slurry of anhydrous $CoCl_2$ (similar to that of Example 1) is mixed with isobutyl aluminum dichloride. When the resulting mixture is allowed to react for 6 hours at 50° C. no blackening of the excess bright blue $CoCl_2$ solids occurs although it appears that considerable of the latter has gone into solution. The reaction mixture can be used, as is, or it can be filtered to remove the unreacted $CoCl_2$ solids to produce a clear, yellowish-colored solution. When utilized in the polymerization of butadiene by the procedures of the preceding examples, soluble polybutadienes are obtained in good yields with both the clear and excess $CoCl_2$ containing solutions. In particular, those catalysts made in this way with Co/Al molar ratios of 2:1, 4:1 and 6:1 at cobalt levels of 1.6 to 18.0 grams of $CoCl_2$ slurry, produce all cis-1,4 polybutadienes. Thus, the presence of solid $CoCl_2$ or a solid, reduced form thereof, is of relatively little effect on polymer structure. The polymers produced in both of these series (with isobutyl aluminum dichloride derived catalysts), while nearly identical in structure, seem to be softer and easier to process by milling than corresponding polymers made with $CoCl_2$/triisobutyl aluminum catalysts of about the same Co/Al ratio.

*Example 5*

The procedure of Example 4 is repeated except for the substitution of ethyl aluminum dichloride. In one case 2 ml. of ethyl aluminum dichloride (1.51 mM.) and 1.3 grams of the $CoCl_2$ dispersion (1.53 mM.) are combined in 100 ml. of benzene. Butadiene is then added and the polymerization carried out at 50° C. In 30 minutes this bottle became a solid mass of polymer cement from which a rubbery polymer in more than 90% yield is obtained. Infrared analysis shows the latter polymer to be all 1,4(50% trans–50% cis).

*Example 6*

In this example, catalysts are prepared from xylene slurries of anhydrous $CoCl_2$ (prepared as in Example 1) combined with diisobutyl aluminum chloride. In one case the Co/Al molar ratio is 1:2 with a level of $CoCl_2$ at 20 mM./liter and the catalyst is mixed in about 20 ml. of solvent (xylene). The mixture is heated at 90° C. under nitrogen to subject it to an accelerated "aging" for about 24 hours. At the end of this time, the bottle contained a solution, only slightly yellowish in color, and entirely free of precipitate. Butadiene is then added and the polymerization carried out 50% C. A yield of better than 90% is obtained, the polymer having a D.S.V. (dilute solution viscosity in toluene) of more than 2.34. The polymer is an essentially all cis-1,4 polybutadiene (i.e. at least 90% cis-1,4). Similar results are obtained with soluble catalyst of this same type in which the Co/Al ratio varies from about 30:1 to about 1:10. All such polymers, however, are all 1,4 polybutadienes, since the proportions of 1,2 structure is quite low.

*Example 7*

In this case $CoCl_2.2H_2O$ is placed in a flask and the latter is rotated in an oil bath while a vacuum is drawn on the flask. The temperature is very gradually increased to 161° C. over the course of 5 or 6 hours or more. The solid in the flask changes color and becomes a light blue color so characteristic of anhydrous $CoCl_2$. In this example, the dry $CoCl_2$ is then cooled gradually under nitrogen flow. The dry $CoCl_2$ is added directly to a polymerization flask, then diisobutyl aluminum chloride, benzene solvent and butadiene are added in rapid order and the bottle is sealed under 15 p.s.i. nitrogen and the bottle placed in a 30° C. water bath. In every case, a clear, essentially water white, viscous solution of polymer is obtained. In the case where the Co/Al ratio is 1:1 at a level of 0.8 mM./liter of $CoCl_2$, a 95% yield of polymer is obtained after work-up as described in the preceding examples. The polymer is found to be a polybutadiene with about 95% cis-1,4 structure.

*Example 8*

A catalyst is prepared by combining finely-divided, anhydrous $CoCl_2$ with pure liquid isobutyl aluminum dichloride, the proportion of the former being sufficient to result in an excess of solid standing in contact with the liquid. At this point the solution obtained analyzes as containing 0.22 mM. of dissolved cobalt per cc. of the catalyst solution. The reaction mixture is prepared by combining 145 grams of benzene, 14 grams of hydrocarbon monomer, and 0.5 cc. of the catalyst solution. The reaction is carried out at 30° C. for only 30 to 42 minutes in an attempt to isolate early polymer and follow the course of the reaction.

In one case, butadiene is combined with from 5 to 50% of a monoolefinic monomer in an attempt to prepare copolymers. Monoolefins employed are styrene, isobutylene, butene-2 and 2-methyl butene-2. In each case a vigorous reaction ensues with yields ranging from about 25 to 100% of polymer. In each monomeric system isolation of dry polymers and infra-red analysis of the latter indicate that as the proportion of monoolefinic monomer charged is increased the infra-red trace shows increased "peaks" corresponding to phenyl (styrene system) or methyl (any of the three 2-butenes). This indicates that both monomers polymerized.

*Example 9*

In this example, copolymers of butadiene and isoprene are prepared using a catalyst similar to that of Example 1 prepared from anhydrous $CoCl_2$ (as a xylene dispersion) and triisobutyl aluminum. The copolymeric products are very tough.

While there have been disclosed in considerable detail certain preferred manners of performing the instant invention, there is no desire nor intention to limit the scope thereby, for the precise proportions of the materials utilized may be varied, and equivalent chemical materials employed, in the manner described, without departing from the spirit and scope of the appended claims.

We claim:

1. A method for producing a solid high-molecular-weight rubbery polymer of a butadiene-1,3 hydrocarbon containing no more than 5 carbon atoms which polymer has more than 90% of the butadiene-1,3 hydrocarbon units present in the 1,4 structure and at least 50% of such units present in the cis-1,4 structure, which method comprises the steps of (A) polymerizing a monomeric material consisting of such butadiene-1,3 hydrocarbon, dissolved in about 1 to 20 times its volume of an inert liquid hydrocarbon solvent, at a temperature of about −30 to about 100° C. in the presence of a catalytic amount with relation to said monomeric material, of a catalyst containing combined cobalt, said catalyst being the product, from which no hydrocarbon-soluble components are removed, obtained by the process of combining at a temperature below 100° C. (a) an anhydrous salt of cobalt in which the cobalt exhibits a primary valence not greater than 3 nor less than 2 with (b) a hydrocarbyl aluminum compound containing at least one hydrocarbon group per molecule bound to aluminum by a carbon-aluminum bond, and (B) separating said polymer of said structure produced in step (A) from said hydrocarbon solvent.

2. A method for producing a solid high-molecular-weight rubbery polybutadiene having more than 90% of the butadiene units present in the cis-1,4 structure, which method comprises the steps of (A) homopolymerizing monomeric butadiene-1,3 dissolved in about 1 to 20 times its volume of a liquid hydrocarbon solvent at a temperature of about −30 to +50° C., in the presence dissolved in said solvent of a catalytic amount with relation to said monomeric butadiene-1,3, of a cobalt-containing-catalyst soluble in said solvent, said catalyst being prepared by combining (a) an anhydrous salt of divalent cobalt with (b) a hydrocarbyl aluminum compound containing at least one hydrocarbon group per molecule bound to aluminum by a carbon-aluminum bond and at least one chlorine atom also bound to aluminum, in a liquid medium at a temperature below 100° C. for a time sufficient for at least a portion of the divalent cobalt to dissolve in the liquid medium, and (B) separating said polybutadiene of said cis-1,4 structure produced in step (A) from said hydrocarbon solvent.

3. The method of claim 2 further characterized in that the liquid hydrocarbon solvent is benzene.

4. The method of claim 3 wherein the alkyl aluminum dichloride is isobutyl aluminum dichloride.

5. The method of claim 4 wherein the trialkyl aluminum is triisobutyl aluminum.

6. A method for producing a solid high molecular weight rubbery polybutadiene having more than 90% of the butadiene units present in the cis-1,4 structure, which method comprises the steps of (A) homopolymerizing monomeric butadiene-1,3 dissolved in about 1 to 20 times its volume of an inert liquid hydrocarbon solvent at a temperature of about −30 to +50° C. in the presence dissolved in said solvent of a catalyst soluble in said solvent containing a catalytic amount, with relation to said monomeric butadiene-1,3 hydrocarbon, of cobalt in complex combination with alkyl, aluminum and chlorine, said catalyst being prepared by intermixing, at a temperature below 100° C. in a liquid hydrocarbon solvent, (1) an anhydrous cobaltous salt of the formula $CoA_2$ wherein $A_2$ represents the anion of the salt and (2) an alkyl aluminum compound of the formula $R_nAlX_{3-n}$ wherein X is chlorine and n is an integer from 1 to 3, A being chlorine when n is 3, and (B) separating said polybutadiene of said cis-1,4 structure produced in step (A) from said hydrocarbon solvent.

7. The method of claim 6 wherein the dialkyl aluminum chloride is diisobutyl aluminum chloride.

8. A method for producing a solid high-molecular-weight rubbery polybutadiene having more than 90% of the butadiene units present in cis-1,4 structure, which method comprises the steps of (A) homopolymerizing monomeric butadiene-1,3 dissolved in about 1 to 20 times its volume of an inert liquid hydrocarbon solvent containing benzene, at a temperature of about −30 to +50° C. in the presence of a small amount, in comparison to said monomeric butadiene-1,3 of a catalyst containing combined cobalt, said catalyst being prepared by admixing a suspension in a hydrocarbon solvent of anhydrous cobalt dichloride with a dialkyl aluminum chloride in proportions to provide a molar ratio of cobalt to aluminum in the range of about 30 to 1 to 1 to 10 and aging said mixture under time-temperature conditions between about 1 hour at room temperature to about 24 hours at 90° C. and (B) separating said polybutadiene of said cis-1,4 structure produced in step (A) from said hydrocarbon solvent.

9. A method for producing a solid high-molecular-weight rubbery polybutadiene having more than 90% of the butadiene units present in cis-1,4 structure, which method comprises the steps of (A) homopolymerizing monomeric butadiene-1,3 dissolved in about 1 to 20 times its volume of an inert liquid hydrocarbon solvent containing benzene, at a temperature of about −30 to +50° C. in the presence dissolved in said solvent of a catalytic amount of a completely soluble catalyst containing cobalt, aluminum and chlorine atoms with the molar proportion of chlorine greater than that of aluminum, and the molar proportion of aluminum greater than that of cobalt, said catalyst being prepared by dissolving anhydrous cobalt dichloride in an alkyl aluminum dichloride and (B) separating said polybutadiene of said cis-1,4 structure produced in step (A) from said hydrocarbon solvent.

10. A method for producing a solid high-molecular-weight rubbery polybutadiene having more than 90% of the butadiene units present in the cis-1,4 structure, which method comprises the steps of (A) homopolymerizing monomeric butadiene-1,3 dissolved in about 1 to 20 times its volume of an inert liquid hydrocarbon solvent containing benzene, at a temperature of about −30 to +50° C. in the presence of a small amount, in comparison to said monomeric butadiene-1,3, of a catalyst containing combined cobalt, said catalyst being the product, from which no benzene-soluble components are removed, obtained by intermixing in benzene hydrocarbon diluent (a) anhydrous cobalt dichloride with (b) a trialkyl aluminum in proportions to provide a molar ratio of cobalt to aluminum in the range of about 25 to 1 to 1 to 1 at about room temperature for a time sufficient to combine (a) with (b) as shown by formation in said diluent of a dark colored solid and (B) separating said polybutadiene of said cis-1,4 structure produced in step (A) from said hydrocarbon solvent.

11. A method for producing a solid high-molecular-weight rubbery polybutadiene having more than 90% of the butadiene units present in cis-1,4 structure, which method comprises the steps of (A) homopolymerizing monomeric butadiene-1,3 dissolved in about 1 to 20 times its volume of inert liquid benzene hydrocarbon solvent at a temperature of about −30 to +50° C. in the presence dissolved in said solvent of a catalytic amount of a completely soluble catalyst containing cobalt, aluminum and chlorine atoms, with the molar proportion of chlorine greater than that of aluminum and the molar proportion of aluminum greater than that of cobalt, said catalyst being prepared from (a) anhydrous cobalt dichloride and (b) a trialkyl aluminum by the process of (1) reacting (a) and (b) in a liquid benzene hydrocarbon medium at a temperature below 100° C. in a proportion to provide a molar ratio of cobalt to aluminum in the range of about 25 to 1 to 1 to 1 and (2) separating from the product the components insoluble in the benzene hydrocarbon medium, and (B) separating said polybutadiene of said cis-1,4 structure produced in step (A) from said hydrocarbon solvent.

12. A method for producing a solid high-molecular-weight rubbery polyisoprene having more than 85% of the isoprene units present in the cis-1,4 structure which method comprises the steps of (A) homopolymerizing monomeric isoprene dissolved in about 1 to 20 times its volume of an inert liquid hydrocarbon solvent at a temperature of about 50° C. in the presence dissolved in said solvent of a catalytic amount of a completely soluble catalyst containing, cobalt, aluminum and chlorine, said catalyst being prepared by reacting in a hydrocarbon medium about 2 moles of anhydrous cobalt dichloride with about 1 mole of triisobutyl aluminum and separating from the product the components insoluble in the hydrocarbon medium and (B) separating said polyisoprene of said cis-1,4 structure produced in step (A) from said hydrocarbon solvent.

References Cited in the file of this patent

UNITED STATES PATENTS

| | | |
|---|---|---|
| 2,234,076 | Gumlich et al. | Mar. 4, 1941 |
| 2,380,617 | Stewart et al. | July 31, 1945 |
| 2,451,180 | Stewart et al. | Oct. 12, 1948 |
| 2,699,457 | Ziegler et al. | Jan. 11, 1955 |
| 2,781,410 | Ziegler et al. | Feb. 12, 1957 |
| 2,905,659 | Miller | Sept. 22, 1959 |
| 2,977,349 | Brockway et al. | Mar. 28, 1961 |

FOREIGN PATENTS

| | | |
|---|---|---|
| 534,792 | Belgium | Jan. 31, 1955 |
| 779,111 | Great Britain | July 17, 1957 |
| 538,782 | Belgium | Dec. 6, 1955 |